(12) United States Patent
Lim

(10) Patent No.: US 10,936,040 B2
(45) Date of Patent: Mar. 2, 2021

(54) SEMICONDUCTOR APPARATUS

(71) Applicant: SK hynix Inc., Icheon-si (KR)

(72) Inventor: Sang Oh Lim, Cheongju-si (KR)

(73) Assignee: SK hynix Inc., Icheon-si (KR)

( * ) Notice: Subject to any disclaimer, the term of this patent is extended or adjusted under 35 U.S.C. 154(b) by 98 days.

(21) Appl. No.: 16/227,926

(22) Filed: Dec. 20, 2018

(65) Prior Publication Data

US 2019/0369692 A1 Dec. 5, 2019

(30) Foreign Application Priority Data

May 31, 2018 (KR) .................. 10-2018-0063011

(51) Int. Cl.
*G06F 1/324* (2019.01)
*G06F 1/12* (2006.01)

(52) U.S. Cl.
CPC ............... *G06F 1/324* (2013.01); *G06F 1/12* (2013.01)

(58) Field of Classification Search
CPC .................................. G06F 1/324; G06F 1/12
See application file for complete search history.

(56) References Cited

U.S. PATENT DOCUMENTS

| | | | |
|---|---|---|---|
| 7,391,250 B1* | 6/2008 | Chuang | H03K 3/0375 326/104 |
| 9,166,567 B2 | 10/2015 | Park et al. | |
| 2004/0075478 A1* | 4/2004 | Correale, Jr. | H03K 3/356008 327/202 |
| 2005/0218943 A1* | 10/2005 | Padhye | G06F 1/324 327/109 |
| 2008/0246503 A1* | 10/2008 | Sumida | G01R 31/318575 324/762.01 |
| 2009/0262588 A1* | 10/2009 | Vilangudipitchai | H03K 3/0375 365/189.11 |
| 2014/0340134 A1* | 11/2014 | Shionoiri | H03K 3/0375 327/198 |
| 2016/0232968 A1* | 8/2016 | August | G11C 11/161 |

* cited by examiner

*Primary Examiner* — Nimesh G Patel
(74) *Attorney, Agent, or Firm* — William Park & Associates Ltd.

(57) ABSTRACT

A semiconductor apparatus includes a clock control circuit that at least one of generates a plurality of latch control clocks, which are periodically transitioned, in response to a power saving mode signal and a clock, and individually locks each of the plurality of latch control clocks to one of multiple levels regardless of the clock. The semiconductor apparatus also includes a latch circuit that stores an input signal in response to the plurality of latch control clocks and outputs the stored signal as an output signal.

7 Claims, 3 Drawing Sheets

SEMICONDUCTOR APPARATUS

CROSS-REFERENCES TO RELATED APPLICATION

The present application claims priority under 35 U.S.C. § 119(a) to Korean application number 10-2018-0063011, filed on May 31, 2018, in the Korean Intellectual Property Office, which is incorporated herein by reference in its entirety.

BACKGROUND

1. Technical Field

Various embodiments generally relate to a semiconductor integrated circuit, and, more particularly, to a semiconductor apparatus.

2. Related Art

A semiconductor apparatus is configured to operate in synchronization with a clock as it operates at a high speed. Furthermore, in order to achieve low power consumption, the semiconductor apparatus is configured to enter a power saving mode, for example, a power-down mode, a self-refresh mode, or a power gating mode.

When the semiconductor apparatus enters the power saving mode, only some of many internal circuits included in the semiconductor apparatus are activated, and the other circuits are deactivated.

Among internal circuits operating in synchronization with a clock, particularly in a latch circuit that stores an input signal in response to the clock, for example, in a flip-flop, a level of the stored signal may be changed when a floated input signal or clock is inputted in the power saving mode.

SUMMARY

In an embodiment, a semiconductor apparatus includes a clock control circuit that at least one of generates a plurality of latch control clocks, which are periodically transitioned, in response to a power saving mode signal and a clock, and individually locks each of the plurality of latch control clocks to one of multiple levels regardless of the clock. The semiconductor apparatus also includes a latch circuit that stores an input signal in response to the plurality of latch control clocks and outputs the stored signal as an output signal.

DETAILED DESCRIPTION

Hereinafter, a semiconductor apparatus is described below with reference to the accompanying drawings and through various example embodiments.

A semiconductor apparatus, in which there is no change in a level of a previously stored signal even though a clock or an input signal is inputted in a power saving mode, is described herein.

According to a semiconductor apparatus, in accordance with an embodiment, in the power saving mode, because there is no change in a level of a previously stored signal, it is possible to remove an abnormal operation of the semiconductor apparatus when the power saving node is switched to a normal node.

A semiconductor apparatus in accordance with an embodiment may substantially maintain a previously stored signal in a power saving mode, store an input signal in response to a clock when the power saving mode is switched to a normal mode, and output the stored signal as an output signal.

Figure 1:
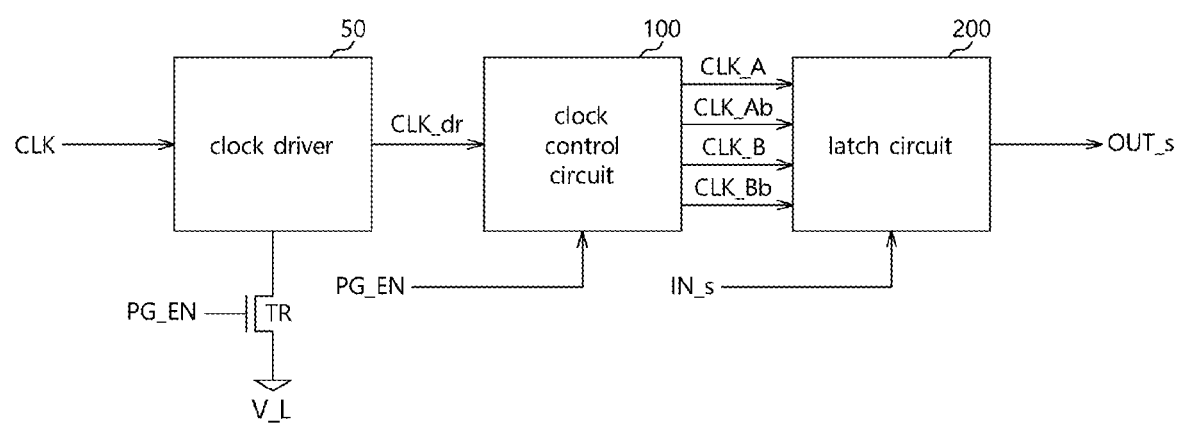
FIG. 1 shows a configuration diagram of a semiconductor apparatus, in accordance with an embodiment.

FIG. 1 shows a configuration diagram of a semiconductor apparatus 300, in accordance with an embodiment, wherein the semiconductor apparatus 300 may include a power transistor TR, a clock driver 50, a clock control circuit 100, and a latch circuit 200.

The power transistor TR may transfer a voltage (for example, a low voltage: V_L) to the clock driver 50 in response to a power saving mode signal PG_EN. For example, when the power saving mode signal PG_EN is disabled, the power transistor TR may transfer the low voltage V_L to the clock driver 50. When the power saving mode signal PG_EN is enabled, the power transistor TR may block the transfer of the low voltage V_L to the clock driver 50.

The clock driver 50 may drive a driving clock CLK_dr, also referred to simply as a clock, when the low voltage V_L is received from the power transistor TR and transfer the driving clock CLK_dr to the clock control circuit 100. When the low voltage V_L is not provided from the power transistor TR, the power transistor TR may form a node, from which the driving clock CLK_dr is outputted, that is, a node through which the clock driver 50 and the clock control circuit 100 are electrically connected to each other, in a floating state. As shown, the clock driver receives an input clock CLK from an external component or another component internal to the semiconductor apparatus.

The clock control circuit 100 may generate first to fourth latch control clocks CLK_A, CLK_Ab, CLK_B, and CLK_Bb, respectively, in response to the power saving mode signal PG_EN and the driving clock CLK_dr. For example, when the power saving mode signal PG_EN is disabled, the clock control circuit 100 may generate the first to fourth latch control clocks CLK_A, CLK_Ab, CLK_B, and CLK_Bb in response to the driving clock CLK_dr. When the power saving mode signal PG_EN is enabled, the clock control circuit 100 may lock each of the first to fourth latch control clocks CLK_A, CLK_Ab, CLK_B, and CLK_Bb to a specific level regardless of the driving clock CLK_dr. For various embodiments, the clock CLK, the driving clock CLK_dr, and the latch control clocks CLK_A, CLK_Ab, CLK_B, and CLK_Bb represent signals transmitted or received by the clock driver 50, the clock control circuit, and/or the latch circuit.

The latch circuit 200 may store an input signal IN_s in response to the first to fourth latch control clocks CLK_A, CLK_Ab, CLK_B, and CLK_Bb and output the stored signal as an output signal OUT_s. Furthermore, the latch circuit 200 may output the stored signal as the output signal OUT_s in response to the first to fourth latch control clocks CLK_A, CLK_Ab, CLK_B, and CLK_Bb regardless of the input signal IN_s. For example, when the first to fourth latch control clocks CLK_A, CLK_Ab, CLK_B, and CLK_Bb, in which voltage levels are changed in response to the driving clock CLK_dr, are received from the clock control circuit 100, the latch circuit 200 may store the input signal IN_s in response to the first to fourth latch control clocks CLK_A, CLK_Ab, CLK_B, and CLK_Bb and output the stored signal as the output signal OUT_s. When the first to fourth latch control clocks CLK_A, CLK_Ab, CLK_B, and CLK_Bb, which have been locked to specific levels regardless of the driving clock CLK_dr, are received from the clock control circuit 100, the latch circuit 200 might output only a signal, which is stored regardless of the input signal IN_s, as the output signal OUT_s.

Figure 2:
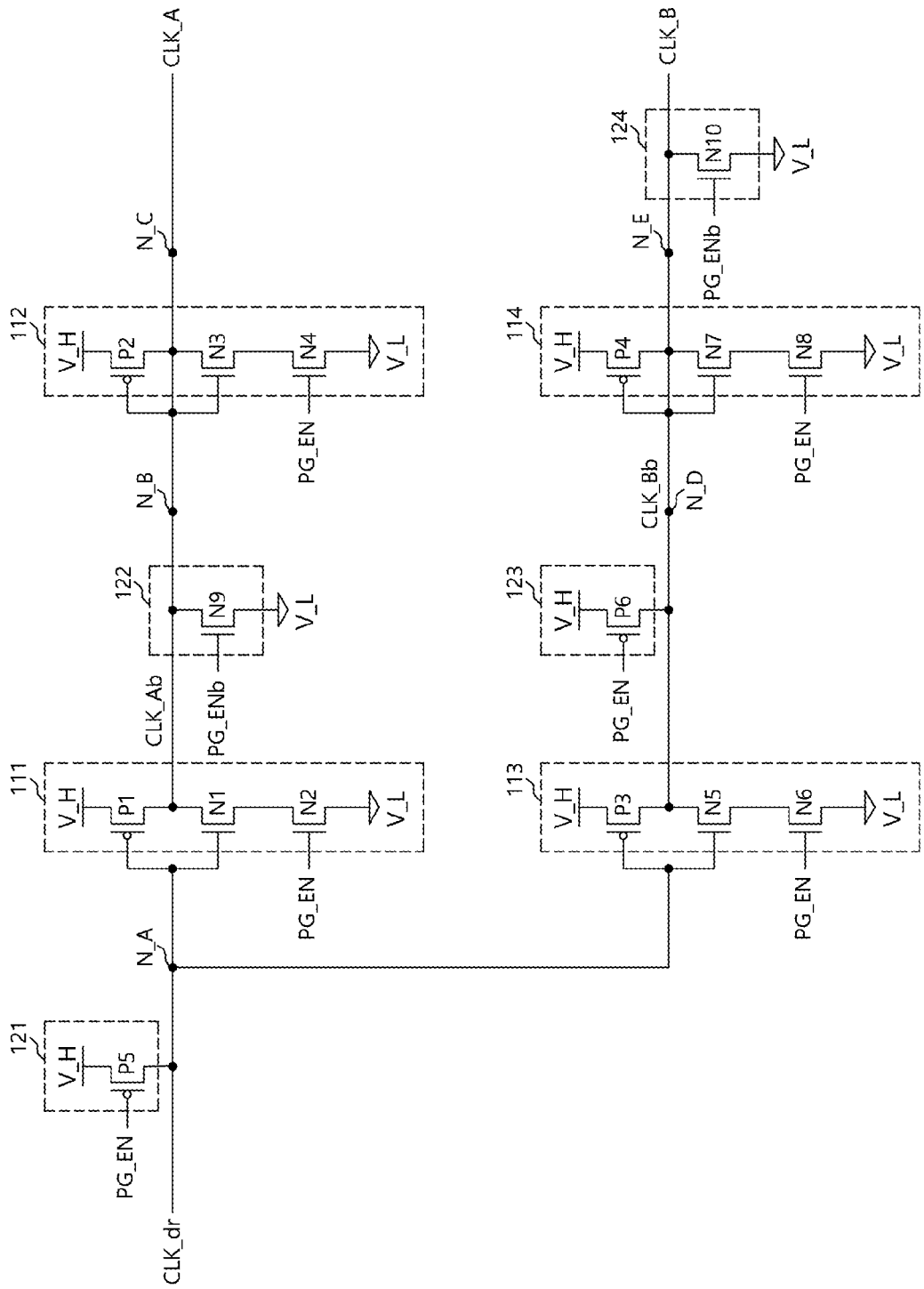
FIG. 2 shows a configuration diagram of a clock control circuit of FIG. 1.

FIG. 2 shows a diagram illustrating a configuration of the clock control circuit 100 illustrated in FIG. 1.

The clock control circuit 100 may include first, second, third, and fourth control inverter circuits 111, 112, 113, and 114 and first, second, third, and fourth level locking circuits 121, 122, 123, and 124.

The first control inverter circuit 111 may be activated when the power saving mode signal PG_EN is disabled at a high level and may invert the driving clock CLK_dr to output the second latch control clock CLK_Ab. The first control inverter circuit 111 may be deactivated when the power saving mode signal PG_EN is enabled at a low level.

The first control inverter circuit 111 may include first, second, and third transistors P1, N1, and N2. For the first transistor P1, the driving clock CLK_dr is inputted to a gate thereof and a high voltage V_H is applied to a source thereof. For the second transistor N1, the driving clock CLK_dr is inputted to a gate thereof and a drain of the first transistor P1 is electrically connected to a drain thereof. For the third transistor N2, the power saving mode signal PG_EN is inputted to a gate thereof, a source of the second transistor N1 is electrically connected to a drain thereof, and a low voltage V_L is applied to a source thereof. The voltage level of the high voltage V_H may be higher than that of the low voltage V_L. The second latch control clock CLK_Ab is outputted from a node through which the first and second transistors P1 and N1 are electrically connected to each other.

The second control inverter circuit 112 may be activated when the power saving mode signal PG_EN is disabled at a high level and invert the second latch control clock CLK_Ab to output the first latch control clock CLK_A. The second control inverter circuit 112 may be deactivated when the power saving mode signal PG_EN is enabled at a low level.

The second control inverter circuit 112 may include fourth, fifth, and sixth transistors P2, N3, and N4. For the fourth transistor P2, the second latch control clock CLK_Ab is inputted to a gate thereof and the high voltage V_H is applied to a source thereof. For the fifth transistor N3, the second latch control clock CLK_Ab is inputted to a gate thereof and a drain of the fourth transistor P2 is electrically connected to a drain thereof. For the sixth transistor N4, the power saving mode signal PG_EN is inputted to a gate thereof, a source of the fifth transistor N3 is electrically connected to a drain thereof, and the low voltage V_L is applied to a source thereof. The first latch control clock CLK_A is outputted from a node through which the fourth and fifth transistors P2 and N3 are electrically connected to each other.

The third control inverter circuit 113 may be activated when the power saving mode signal PG_EN is disabled at a high level and invert the driving clock CLK_dr to output the fourth latch control clock CLK_Bb. The third control inverter circuit 113 may be deactivated when the power saving mode signal PG_EN is enabled at a low level.

The third control inverter circuit 113 may include seventh, eighth, and ninth transistors P3, N5, and N6. For the seventh transistor P3, the driving clock CLK_dr is inputted to a gate thereof and the high voltage V_H is applied to a source thereof. For the eighth transistor N5, the driving clock CLK_dr is inputted to a gate thereof and a drain of the seventh transistor P3 is electrically connected to a drain thereof. In the ninth transistor N6, the power saving mode signal PG_EN is inputted to a gate thereof, a source of the eighth transistor N5 is electrically connected to a drain thereof, and the low voltage V_L is applied to a source thereof. The fourth latch control clock CLK_Bb is outputted from a node through which the seventh and eighth transistors P3 and N5 are electrically connected to each other.

The fourth control inverter circuit 114 may be activated when the power saving mode signal PG_EN is disabled at a high level, and invert the fourth latch control clock CLK_Bb to output the third latch control clock CLK_B. The fourth control inverter circuit 114 may be deactivated when the power saving mode signal PG_EN is enabled at a low level.

The fourth control inverter circuit 114 may include tenth, eleventh, and twelfth transistors P4, N7, and N8. For the tenth transistor P4, the fourth latch control clock CLK_Bb is inputted to a gate thereof and the high voltage V_H is applied to a source thereof. For the eleventh transistor N7, the fourth latch control clock CLK_Bb is inputted to a gate thereof and a drain of the tenth transistor P4 is electrically connected to a drain thereof. For the twelfth transistor N8, the power saving mode signal PG_EN is inputted to a gate thereof, a source of the eleventh transistor N7 is electrically connected to a drain thereof, and the low voltage V_L is applied to a source thereof. The third latch control clock CLK_B is outputted from a node through which the tenth and eleventh transistors P4 and N7 are electrically connected to each other.

The node through which the first and third control inverter circuits 111 and 113 receive the driving clock CLK_dr is referred to as a first node N_A, the node through which the first and second control inverter circuits 111 and 112 are electrically connected to each other is referred to as a second node N_B, and the node from which the second control inverter circuit 112 outputs the first latch control clock CLK_A is referred to as a third node N_C. The node through which the third and fourth control inverter circuits 113 and 114 are electrically connected to each other is referred to as a fourth node N_D, and the node from which the fourth control inverter circuit 114 outputs the third latch control clock CLK_B is referred to as a fifth node N_E.

The first level locking circuit 121 may lock the driving clock CLK_dr to a high level in response to the power saving mode signal PG_EN. For example, when the power saving mode signal PG_EN is enabled at a low level, the first level locking circuit 121 may lock the first node N_A to a high level, regardless of the driving clock CLK_dr, by applying the high voltage V_H to the first node N_A. In such a case, the first control inverter circuit 111 may allow its own output node to float.

The first level locking circuit 121 may include a thirteenth transistor P5. For the thirteenth transistor P5, the power saving mode signal PG_EN is inputted to a gate thereof, the high voltage V_H is applied to a source thereof, and the first node N_A is electrically connected to a drain thereof.

The second level locking circuit 122 may lock the second node N_B to a low level in response to the power saving mode signal PG_EN. For example, when the power saving mode signal PG_EN is enabled at a low level, the second level locking circuit 122 may lock the second latch control clock CLK_Ab to a low level by applying the low voltage V_L to the second node N_B. In such a case, the second control inverter circuit 112 may receive the second latch control clock CLK_Ab transitioned to a low level, and the transistor P2 of the second control inverter circuit 112 may pull-up its own output node to lock the first latch control clock CLK_A to a high level.

The second level locking circuit 122 may include a fourteenth transistor N9. For the fourteenth transistor N9, an inversion signal PG_ENb of the power saving mode signal PG_EN is inputted to a gate thereof, the second node N_B is electrically connected to a drain thereof, and the low voltage V_L is applied to a source thereof.

The third level locking circuit 123 may lock the fourth node N_D to a high level in response to the power saving mode signal PG_EN. For example, when the power saving mode signal PG_EN is enabled at a low level, the third level locking circuit 123 may lock the fourth latch control clock CLK_Bb to a high level by applying the high voltage V_H to the fourth node N_D.

The third level locking circuit 123 may include a fifteenth transistor P6. For the fifteenth transistor P6, the power saving mode signal PG_EN is inputted to a gate thereof, the high voltage V_H is applied to a source thereof, and the fourth node N_D is electrically connected to a drain thereof.

The fourth level locking circuit 124 may lock the fifth node N_E to a low level in response to the power saving mode signal PG_EN. For example, when the power saving mode signal PG_EN is enabled at a low level, the fourth level locking circuit 124 may lock the third latch control clock CLK_B to a low level by applying the low voltage V_L to the fifth node N_E.

The fourth level locking circuit 124 may include a sixteenth transistor N10. For the sixteenth transistor N10, the inversion signal PG_ENb of the power saving mode signal PG_EN is inputted to a gate thereof, the fifth node N_E is electrically connected to a drain thereof, and the low voltage V_L is applied to a source thereof.

Figure 3:
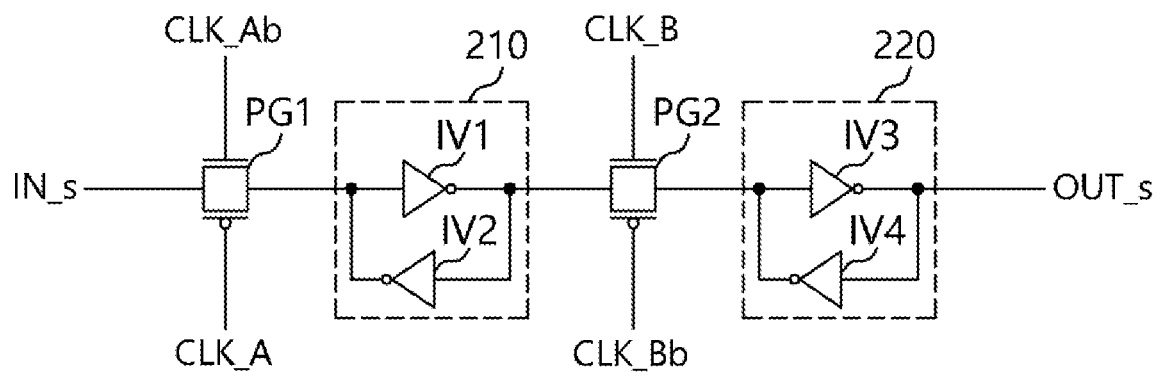
FIG. 3 shows a configuration diagram of a latch circuit of FIG. 1.

FIG. 3 shows a diagram illustrating a configuration of the latch circuit 200 illustrated in FIG. 1.

The latch circuit 200 may include first and second pass gates PG1 and PG2 and first and second latch units 210 and 220.

The first pass gate PG1 may transfer the input signal IN_s to the first latch unit 210 or may block the transfer of the input signal IN_s to the first latch unit 210 in response to the first and second latch control clocks CLK_A and CLK_Ab. For example, when the first latch control clock CLK_A is at a low level and the second latch control clock CLK_Ab is at a high level, the first pass gate PG1 transfers the input signal IN_s to the first latch unit 210. When the first latch control clock CLK_A is at a high level and the second latch control clock CLK_Ab is at a low level, the first pass gate PG1 blocks the transfer of the input signal IN_s to the first latch unit 210.

In the first pass gate PG1, the second latch control clock CLK_Ab is inputted to a first control terminal, the first latch control clock CLK_A is inputted to a second control terminal, the input signal IN_s is inputted to an input terminal, and the first latch unit 210 is electrically connected to an output terminal.

The first latch unit 210 may store a signal transferred from the first pass gate PG1 and transfer the stored signal to the second pass gate PG2.

The first latch unit 210 may include first and second inverters IV1 and IV2. In the first inverter IV1, the first pass gate PG1 is electrically connected to an input terminal and the second pass gate PG2 is electrically connected to an output terminal. In the second inverter IV2, the output terminal of the first inverter IV1 is electrically connected to an input terminal and the input terminal of the first inverter IV1 is electrically connected to an output terminal.

The second pass gate PG2 may transfer an output signal of the first latch unit 210 to the second latch unit 220 or separate the first latch unit 210 and the second latch unit 220 from each other in response to the third and fourth latch control clocks CLK_B and CLK_Bb. For example, when the third latch control clock CLK_B is at a low level and the fourth latch control clock CLK_Bb is at a high level, the second pass gate PG2 separates the first latch unit 210 and the second latch unit 220 from each other. When the third latch control clock CLK_B is at a high level and the fourth latch control clock CLK_Bb is at a low level, the second pass gate PG2 transfers the output signal of the first latch unit 210 to the second latch unit 220.

In the second pass gate PG2, the third latch control clock CLK_B is inputted to a first control terminal, the fourth latch control clock CLK_Bb is inputted to a second control terminal, the first latch unit 210 is electrically connected to an input terminal, and the second latch unit 220 is electrically connected to an output terminal.

The second latch unit 220 may store a signal transferred from the second pass gate PG2 and transfer the stored signal as the output signal OUT_s.

The second latch unit 220 may include third and fourth inverters IV3 and IV4. In the third inverter IV3, the second pass gate PG2 is electrically connected to an input terminal and the output signal OUT_s is outputted from an output terminal. In the fourth inverter IV4, the output terminal of the third inverter IV3 is electrically connected to an input terminal and the input terminal of the third inverter IV3 is electrically connected to an output terminal.

Hereinafter, an operation of the semiconductor apparatus 300, configured as described above, is described.

The following description is provided for an operation of the semiconductor apparatus 300 when a current mode is not the power saving mode, that is, when the current mode is the normal mode. The power saving mode may include modes (e.g., a power-down mode, a power gating mode, a self-refresh mode, and the like) for reducing power consumed in the semiconductor apparatus 300.

Hereinafter, an operation of the clock control circuit 100 in the normal mode is described with reference to FIG. 2.

In the normal mode, the power saving mode signal PG_EN is disabled at a high level.

The first to fourth control inverter circuits 111 to 114 are activated by receiving the power saving mode signal PG_EN disabled at a high level.

The activated first control inverter circuit 111 inverts the driving clock CLK_dr to output the second latch control clock CLK_Ab.

The activated second control inverter circuit 112 inverts the second latch control clock CLK_Ab to output the first latch control clock CLK_A.

The activated third control inverter circuit 113 inverts the driving clock CLK_dr to output the fourth latch control clock CLK_Bb.

The activated fourth control inverter circuit 114 inverts the fourth latch control clock CLK_Bb to output the third latch control clock CLK_B.

In brief, in the normal mode, the clock control circuit 100, in accordance with an embodiment, generates the first to fourth latch control clocks CLK_A, CLK_Ab, CLK_B, and CLK_Bb, which are periodically transitioned, in response to the driving clock CLK_dr. As used herein, the phrase "periodically transitioned" means one or more of the latch control clocks CLK_A, CLK_Ab, CLK_B, and CLK_Bb switch between voltage levels, for example, between a high voltage level and a low voltage level, also referred to as levels, at various times. In some instances, the levels are high and low relative to one another. That is, the high level is greater than the low level.

Hereinafter, an operation of the latch circuit 200, which receives the first to fourth latch control clocks CLK_A, CLK_Ab, CLK_B, and CLK_Bb periodically transitioned, is described with reference to FIG. 3.

The first and second pass gates PG1 and PG2 may receive the first to fourth latch control clocks CLK_A, CLK_Ab, CLK_B, and CLK_Bb periodically transitioned, transfer the input signal IN_s to the first latch unit 210, and transfer a signal stored in the first latch unit 210 to the second latch unit 220. In such a case, the first latch unit 210 receives and stores a signal transferred from the first pass gate PG1, and transfers the stored signal to the second pass gate PG2. The second latch unit 220 receives and stores a signal transferred from the second pass gate PG2, and outputs the stored signal as the output signal OUT_s.

As a consequence, in the normal mode, the semiconductor apparatus 300, in accordance with an embodiment, can perform an operation for storing an input signal in response to a clock and outputting the stored signal as an output signal.

Hereinafter, an operation of the clock control circuit 100 in the power saving mode is described, in accordance with an embodiment.

The operation of the clock control circuit 100 in the power saving mode is described with reference to FIG. 2.

In the power saving mode, the power saving mode signal PG_EN is enabled at a low level.

The first to fourth control inverter circuits 111 to 114 are deactivated by receiving the power saving mode signal PG_EN enabled at a low level.

The first level locking circuit 121 receives the power saving mode signal PG_EN enabled at a low level and locks the first node N_A to a high level.

The second level locking circuit 122 receives the power saving mode signal PG_EN enabled at a low level and locks the second node N_B to a low level. That is, the second latch control clock CLK_Ab is locked to a low level. When the second latch control clock CLK_Ab is at a low level, the fourth transistor P2 of the second control inverter circuit 112 is turned on and locks the third node N_C to a high level. Accordingly, in the power saving mode, when the third node N_C is locked to a high level, the first latch control clock CLK_A is locked to a high level.

The third level locking circuit 123 receives the power saving mode signal PG_EN enabled at a low level and locks the fourth node N_D to a high level. When the fourth node N_D is locked to a high level, the fourth latch control clock CLK_Bb is locked to a high level.

The fourth level locking circuit 124 receives the power saving mode signal PG_EN enabled at a low level and locks to the fifth node N_E to a low level. When the fifth node N_E is locked to a low level, the third latch control clock CLK_B is locked to a low level.

In brief, in the power saving mode, the clock control circuit 100, in accordance with an embodiment, locks the first to fourth latch control clocks CLK_A, CLK_Ab, CLK_B, and CLK_Bb to specific levels regardless of the driving clock CLK_dr.

Hereinafter, an operation of the latch circuit 200, which receives the first to fourth latch control clocks CLK_A, CLK_Ab, CLK_B, and CLK_Bb locked to specific levels, is described with reference to FIG. 3.

The first pass gate PG1 receives the first latch control clock CLK_A locked to a high level and the second latch control clock CLK_Ab locked to a low level, and blocks the transfer of the input signal IN_s to the first latch unit 210. In the case of the power saving mode, because the first latch unit 210 does not receive the input signal IN_s by the first pass gate PG1, the first latch unit 210 stores a signal stored before entering to the power saving mode.

The second pass gate PG2 receives the third latch control clock CLK_B locked to a low level and the fourth latch control clock CLK_Bb locked to a high level, and separates the first latch unit 210 and the second latch unit 220 from each other. In the case of the power saving mode, because the second latch unit 220 is separated from the first latch unit 210 by the second pass gate PG2, the second latch unit 220 stores a signal stored before entering the power saving mode and outputs the stored signal as the output signal OUT_s.

As a consequence, in the power saving mode, the semiconductor apparatus 300, in accordance with an embodiment, can perform an operation for storing a signal stored before entering to the power saving mode and outputting the stored signal as an output signal.

The semiconductor apparatus 300, in accordance with an embodiment can lock the first node N_A, to which the driving clock CLK_dr is inputted, to a high level in the power saving mode, thereby preventing the driving clock CLK_dr from floating and a glitch component from occurring in the driving clock CLK_dr. Furthermore, in the power saving mode, the semiconductor apparatus 300, in accordance with an embodiment, can lock the plurality of latch control clocks CLK_A, CLK_Ab, CLK_B, and CLK_Bb inputted to the latch circuit to specific levels, thereby blocking respective input of the plurality of latch units 210 and 220 and substantially maintaining a signal stored before the power saving mode.

While various embodiments have been described above, it will be understood to those skilled in the art that the described embodiments serve as examples only and represent a limited number of possible embodiments. Accordingly, the semiconductor apparatus 300 described herein should not be limited based on the described embodiments.

What is claimed is:
1. A semiconductor apparatus comprising:
a clock control circuit configured to at least one of generate a plurality of latch control clocks, which are periodically transitioned, in response to a power saving mode signal and a clock, and to individually lock each of the plurality of latch control clocks to one of multiple levels regardless of the clock; and
a latch circuit configured to store an input signal in response to the plurality of latch control clocks and output the stored signal as an output signal;
wherein the latch circuit includes first and second pass gates and first and second latch circuits; and
wherein the first pass gate blocks a transfer of the input signal to the first latch circuit based on the plurality of latch control clocks in a power saying mode; and
wherein the second pass gate separates the first latch circuit and the second latch circuit from each other based on the plurality of latch control clocks in a power saying mode.
2. The semiconductor apparatus according to claim 1, wherein the clock control circuit comprises:
a plurality of control inverter circuits configured to generate the plurality of latch control clocks in response to the power saving mode signal and the clock; and a plurality of level locking circuits configured to lock the plurality of latch control clocks in response to the power saving mode signal, wherein each latch control clock of the plurality of latch control clocks is individually locked to a low level or a high level of the multiple levels.

3. The semiconductor apparatus according to claim 2, wherein each of the plurality of control inverter circuits activates when the power saving mode signal is disabled and generates an associated latch control clock of the plurality of latch control clocks in response to the clock, and each of the plurality of control inverter circuits deactivates when the power saving mode signal is enabled.

4. The semiconductor apparatus according to claim 2, wherein the plurality of control inverter circuits are serially connected, and wherein at least one of the plurality of level locking circuits is electrically connected to a node through which the plurality of control inverter circuits are serially connected.

5. The semiconductor apparatus according to claim 4, wherein at least one of the plurality of control inverter circuits pulls up an output node in response to one of the plurality of level locking circuits and locks a latch control clock of the plurality of latch control clocks to the low level or the high level when the power saving mode signal is enabled.

6. The semiconductor apparatus according to claim 4, wherein at least one of the plurality of control inverter circuits allows an output node to float in response to one of the plurality of level locking circuits when the power saving mode signal is enabled.

7. The semiconductor apparatus according to claim 1, wherein, when the plurality of latch control clocks are periodically transitioned, the latch circuit stores the input signal and outputs the stored signal as the output signal, and wherein, when each of the plurality of latch control clocks is locked to the specific level, the latch circuit outputs only the stored signal as the output signal regardless of the input signal.

* * * * *

UNITED STATES PATENT AND TRADEMARK OFFICE
CERTIFICATE OF CORRECTION

PATENT NO. : 10,936,040 B2
APPLICATION NO. : 16/227926
DATED : March 2, 2021
INVENTOR(S) : Sang Oh Lim It is certified that error appears in the above-identified patent and that said Letters Patent is hereby corrected as shown below:

In the Claims

Claim 1 in Column 8, Lines 58 and 62 correct the phrase to "power saving mode" instead of "power saying mode".

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*